Patented Sept. 8, 1936

2,054,006

UNITED STATES PATENT OFFICE 2,054,006

METHOD OF TREATING ALCOHOLIC BEVERAGES

Mark Shoeld, Baltimore, Md., assignor of one-half to Edward Hyatt Wight, Baltimore, Md.

No Drawing. Application September 6, 1934, Serial No. 742,889

4 Claims. (Cl. 99—48)

In the production of alcoholic beverages, be it completely distilled products as for instance whiskies and brandies or straight fermentation products like beers and wines or mixtures of the two as for instance fortified wines, there is always a certain aging or curing period required to produce the necessary quality as to palatability or taste and flavor or bouquet.

The length of time required to produce these results varies a good deal depending upon what type of product is handled and what degree of quality of final product is desired. The range of time may be from a few months to a good many years.

What changes actually take place during the aging to produce the desired results is still very much of a mystery. It is impossible to determine the quality as specified above by means of chemical analysis. In other words, the quality is largely a matter of taste and smell and probably a combination of the two. It is probably true that the primary physiological effect of all alcoholic beverages is due to the ethanol, but the value of the product depends primarily upon other substances, present in very minute quantities, which produce the flavor and bouquet.

A very large item in the cost of production of high grade alcoholic beverages, especially of the distilled type, is due to the length of time required for aging. Severe treatments of freshly distilled liquors as for instance repeated charcoal or activated charcoal filtrations or chemical treatments followed by redistillation do of course eliminate rank and harsh odors and tastes, but at the same time they destroy the substances which are or produce the commercially valuable characteristics.

By means of this invention it has been found possible to eliminate the undesirable tastes and odors and retain the valuable and characteristic tastes and odors.

Briefly described, this invention consists in contacting an alcoholic beverage with air, which is passed cyclically in contact with a weak solution of non-volatile alkali and then in contact with a weak solution of non-volatile acid and back in contact with the alcoholic beverage. The ethanol vapor pressure of the alkali and acid solutions is substantially the same as that of the alcoholic beverage.

In view of what has been stated previously, I am unable to offer any explanation or theory as to why my treatment is successful.

As a specific example of the method of carrying out my invention, I will now describe my treatment in connection with the production of rye whiskey.

Freshly distilled rye whiskey is contacted with air in a hurdle packed tower. This tower is made of wood or is wood lined and the hurdles are made of wood slats. For a capacity of 100 gallons liquor per hour the diameter of the scrubber is about four and a half feet and the height is about twenty-five feet. The air is introduced at the bottom by means of a blower at a rate of about 2000 cubic feet per minute. The exit air from the top of the scrubber is passed to a lead lined scrubber packed with coke, over which a solution of 50% ethanol and 10% sulphuric acid is circulated. In case the whiskey is over 100 proof, the alcohol percentage of the treating solution is of course correspondingly increased. In case the whiskey is less than 100 proof, the alcohol percentage of the treating solution is correspondingly reduced. The air from the "acid scrubber" is passed through an alkali scrubber, which is made of steel and is provided with a packing of steel turnings. A solution of 50% ethanol and 10% caustic soda is recirculated over the steel turnings. The air from the "caustic scrubber" goes to the inlet of the blower and from there back to the whiskey treating tower.

All rank odors and harsh tastes have been eliminated from the treated whiskey, but more important, the characteristic "grainy" smell has been practically untouched.

The treated whiskey is put into charred oak barrels to acquire color and final flavor changes. The important point in this connection is that a storage period of from three to six months produces a quality of rye whiskey corresponding to six or eight year old untreated whiskey.

The above described treating process may be varied a number of ways. I have for instance found that if the recirculated air is contacted with only one solution, either acid or alkali, the smell and taste of the alcoholic beverage is improved very considerably. The preferred method is, however, to use two treating solutions.

The concentration of alkali and acid used may vary quite considerably but the preferred method is to use concentrations ranging from 5% to 10%.

Soda ash may be used instead of caustic soda. Any other soluble alkali or alkaline earth hydrate or carbonate may be used.

Instead of sulphuric acid, any other soluble and nonvolatile acid may be used, as for instance phosphoric acid.

I have also found that the addition of small percentages of oxidizing salts to either the alkali or acid solution improves the action of the treating solution. I may for instance add 0.1% to 1% of potassium permanganate to the sulphuric acid solution. Instead of potassium permanganate I may use potassium bichromate or ferric sulphate. In the alkaline solution I may use small percentages of alkali manganates or alkali chromates.

Instead of using air, I may use other gases as for instance nitrogen, carbon dioxide, oxygen, etc. The term "inert gas" as used in the appended claims refers to any of the aforesaid gases and is to be interpreted to include any gas which does not detrimentally affect the bouquet or the palatability of the liquor under treatment.

The preferred temperature of the treatment is about 80° F. to 100° F. If the temperature used is a good deal higher, say in the order of 150° F., I find that it is necessary to reduce the concentration of both the alkali and the acid in order to prevent destroying the desirable odors and tastes.

Having thus described my invention, those skilled in this art will understand, that the invention is not necessarily restricted by the description given above, because this is subject to more or less radical modifications without departure from the substance and essence of the invention as defined by the appended claims and without sacrificing any of its substantial benefits and advantages.

I claim:

1. In a method of treating alcoholic liquors to eliminate undesirable tastes and odors, and to prevent destruction of desirable tastes and aromas, the steps comprising circulating a current of inert gas in a cyclic system in which alcoholic liquor, an acid solution containing alcohol, and an alkaline solution containing alcohol are each maintained in separate zones, while intimately contacting the said solutions and the said liquor with the circulating gas, and maintaining the alcohol vapor pressure throughout the system and in the separate zones substantially uniform.

2. In a method of treating alcoholic liquors to eliminate undesirable tastes and odors, and to prevent destruction of desirable tastes and aromas, the steps comprising mixing alcohol with an agent containing liquor treating material selected from a group consisting of non-volatile acids and non-volatile alkaline material to form a solution having an alcohol vapor pressure substantially the same as that of the alcoholic liquor under treatment, and passing a current of inert gas through a circulatory system successively in contact with alcoholic liquor and treating material, the said alcoholic liquor and treating material being maintained in separate zones in the said circulatory system out of contact with each other, while maintaining alcohol vapor pressure throughout the system substantially uniform.

3. In a method of treating alcoholic liquors to eliminate undesirable tastes and odors, and to prevent destruction of desirable tastes and aromas, the steps comprising passing air through a circulatory system successively in contact with alcoholic liquor, and liquor treating material selected from a group consisting of non-volatile acid-containing material and non-volatile alkaline compound-containing material, the said alcoholic liquor and treating material being maintained in separate zones in the said circulatory system out of contact with each other, while maintaining alcohol vapor pressure throughout the system substantially uniform.

4. In a method of treating alcoholic liquors to eliminate undesirable tastes and odors, and to prevent destruction of desirable tastes and aromas, the steps comprising circulating a current of inert gas in a cyclic system in which alcoholic liquor, an acid treating agent containing alcohol, and an alkaline treating agent containing alcohol are each maintained in separate zones, while intimately contacting the said agents and the said liquor with the circulating gas and maintaining the alcohol vapor pressure throughout the system and in the separate zones substantially uniform, at least one of the zones in which the said agents are contacted containing oxidizing salt.

MARK SHOELD.